United States Patent [19]

Doty et al.

[11] Patent Number: 4,928,755

[45] Date of Patent: May 29, 1990

[54] MICROTUBE STRIP SURFACE EXCHANGER

[75] Inventors: Francis D. Doty; Jonathan B. Spitzmesser, both of Columbia, S.C.

[73] Assignee: Doty Scientific, Inc., Columbia, S.C.

[21] Appl. No.: 200,139

[22] Filed: May 31, 1988

[51] Int. Cl.⁵ .................................. F28F 3/12
[52] U.S. Cl. ..................... 165/168; 165/174
[58] Field of Search ............... 165/171, 173, 174, 175, 165/180, 168; 122/6 B

[56] References Cited

U.S. PATENT DOCUMENTS 3,289,756 12/1966 Jaeger .................................. 165/171
4,676,305 6/1987 Doty ................................. 165/173 X

FOREIGN PATENT DOCUMENTS 25172 of 1900 United Kingdom ............... 165/174

Primary Examiner—Albert J. Makay
Assistant Examiner—Noah Kamen
Attorney, Agent, or Firm—Brumbaugh, Graves, Donohue & Raymond

[57] ABSTRACT

A microtube-strip module, consisting of a plurality of parallel rows of microtubes, metallurgically bonded to rectangular header tubestrips, is encapsulated in solid metal in such a way as to leave at least one major surface exposed in a manner suitable for metallurgical bonding to an objective surface requiring heat transfer. Fluid connections are provided perpendicular to the objective surface to facilitate parallel manifolding of a plurality of these modules with high surface coverage. The device is intended for ultra high thermal flux applications, especially in aerospace and in controlled thermonuclear fusion, for the efficient transfer of heat between an objective surface and a working fluid, especially high pressure helium gas.

8 Claims, 2 Drawing Sheets

PRIOR ART

MICROTUBE STRIP SURFACE EXCHANGER

FIELD OF THE INVENTION

The field of this invention is heat exchangers, and, more particularly, low mass exchangers intended to transfer heat between a solid (structural or functional) objective surface and a constrained fluid at very high thermal flux per mass.

BACKGROUND OF THE INVENTION

The vast majority of all heat transfer applications are primarily concerned with heat transfer between two fluids, which necessarily involves an interfacial solid surface. This invention, however, relates to a distinctly different class of applications in which the heat transfer design addresses only that portion of the system involving heat transfer between an objective surface and a working fluid.

Examples of low thermal flux surface-fluid transfer applications can be found in the following: (1) solar energy, where tubes are bonded to a surface that is exposed to the sun, such as that by Bowen in U.S. Pat. No. 4,150,657; (2) electronics, where finned surfaces are commonly employed to cool a surface that has been conduction heated by electronic devices, such as described by Friedman et al in U.S. Pat. No. 4,478,277; and (3) manufacturing processes, such as described by Hedin in U.S. Pat. No. 4,003,687 and Diener et al in U.S. Pat. No. 4,335,870. Wittel, U.S. Pat. No. 4,583,583, uses spring-like inserts in 6 mm I.D. fluorocarbon tubing for crimp resistance in forming serpentine fluid paths between grooved metal blocks for moderately low flux applications in fuel cells. Andres et al, U.S. Pat. No. 4,550,774, use heat pipe condenser plates to distribute heat to vehicle surfaces at moderately low flux. Germann, U.S. Pat. No. 4,266,603, discloses a method of forming tubes for fluid passage from jaws on an extruded surface. Darling et al, U.S. Pat. No. 4,294,199, cover the surface of a magnetohydrodynamic (MHD) diffuser with parallel tubes for moderate flux at high temperatures. Typical heat fluxes in the above examples are about 1 kW/m$^2$ in solar energy, and 10–50 kW/m$^2$ in most other applications, but fluxes below 100 W/m$^2$ are the object of certain solar heating applications, such as Platell, U.S. Pat. No. 4,186,795.

Electronic device cooling applications have led to the development of compact, high thermal flux, surface-fluid exchangers. Heide et al, U.S. Pat. No. 4,161,213 describe a cooling capsule for a thyristor that utilizes a drilled, metallic core with electron-beam welded header plates completing the fluid-tight serpentine path. Ruger, U.S. Pat. No. 4,161,980, encapsulates a bifilar wound (stainless) tube in an aluminum capsule for the same purpose. Iversen, U.S. Pat. No. 4,712,609, utilizes transverse pressure gradients for vortex induced turbulence and nucleate boiling enhancement in a microchannel extrusion with special surface preparation to achieve thermal fluxes up to 13 MW/m$^2$ with bi-phasic fluids.

Several additional applications have developed for low mass, high thermal flux, surface coolers. Solar cells as used in space power applications require low mass, low thermal gradient, back side cooling at fluxes up to 0.1 MW/m$^2$ in high ratio concentrators. Stultz, U.S. Pat. No. 4,397,303, describes a multilayer, multi-channel extrusion for use with a solar concentrator. Little, in U.S. Pat. Nos. 4,386,505, 4,392,362, and 4,489,570, discloses the use of multilayer glass laminate structures with micron sized channels, lithographically etched, for high flux, low mass, heat transfer in Joule-Thompson refrigerators and in surface cooling applications, especially for IR detectors. Little's laminar flow devices are relatively fragile, expensive, and not suitable for high temperature applications.

Leading edges of hypersonic aircraft are subject to friction heating in excess of 0.5 MW/m$^2$. Rocket nozzles and diffusers require surface cooling of 0.2 to 15 MW/m$^2$. Fuel injector struts in scram jets require cooling at 5 to 15 MW/m$^2$. Niino et al, U.S. Pat. No. 4,703,620, use a porous wall to achieve such ultra high fluxes with sacrificial perspiration of the working fluid through the wall. In all of the above aerospace applications, exchanger mass is crucial.

The appropriate figure-of-merit in these aerospace applications is specific conductance, measured in W/kgK, where the total system mass and total temperature difference $T_\delta$ are considered along with total power transfer. (The thermal siphon literature has often confused the central issue by separate analyses of power-distance products, surface conductance in terms of W/m$^2$K, film transfer coefficients, etc.) Prior art surface-to-helium pumped loops have achieved about 10–50 W/kgK, and very short (3 cm) liquid lithium heat pipes have achieved about 800 W/kgK, but heat pipes are effective only at short distances—they degrade rapidly at distances above 50 cm. The present invention is capable of achieving 300–1500 W/kgK with helium gas pumped loops, which are nearly independent of source to sink transfer distance.

The first wall of a controlled thermonuclear fusion (either inertial or magnetic confinement) reactor chamber may experience pulse heat fluxes in excess of $\approx 1$ MW/m$^2$ and may require average cooling rates in excess of 2 MW/m$^2$. It is desirable to provide such first-wall cooling in a fusion reactor by means of an exchanger that has minimal absorption of fast-spectrum neutrons and—in the case of magnetic confinement—minimal MHD interactions, as discussed by Werner et al, U.S. Pat. No. 4,394,344.

In these applications surface conductance is the more appropriate figure-of-merit, providing a pumped loop is used that avoids distance transfer problems, neutron absorption, and MHD interactions. Prior art surface conductances for pumped helium loops have not generally exceeded 1 kW/m$^2$K. (Very short liquid lithium heat pipes have achieved over 50 kW/m$^2$K.) The present invention permits over 10 kW/m$^2$K with pumped helium loops. Prior art laminar flow, single phase, surface-helium exchangers have generally not exceeded 0.1 MW/m$^2$, except for Little's devices, which may achieve 0.5 MW/m$^2$. The present invention, a laminar flow, single phase exchanger, is capable of achieving continuous surface fluxes over 10 MW/m$^2$ with helium gas, and somewhat higher fluxes are possible with hydrogen gas. Moreover, the extremely low mass of the present invention makes it advantageous even for certain low flux applications such as low temperature space radiators at surface fluxes below 1 kW/m$^2$. This last example is one of the rare variations in which positive heat transfer occurs from the fluid to the surface rather than vice versa.

Prior art high flux surface-fluid exchange has been obtained only by incorporating one or more of the following options: (1) high velocity, highly turbulent fluid flow, and, hence, high pumping power losses; (2) high conductivity liquids such as molten salts or metals, especially lithium and alloys of sodium and potassium, with their attendant materials handling problems; (3) liquid-gas phase change, especially in thermal siphons, which are effective only over a narrow range of thermal, inertial, and gravitational conditions; (4) lithographic laminate structures, which are fragile, expensive, and unsuitable for high temperatures.

Little's devices may have advantages in certain cryogenic applications, and Iversen's designs, Ruger's designs, etc. may be preferable for very small device cooling applications. However, the instant invention has substantial advantages over the prior art in nearly all other high flux, low mass, low neutron absorption, and low MHD applications.

It is usually highly desirable to obtain the requisite heat transfer with minimum practical temperature difference $T_\delta$ between the fluid and the objective surface for one or both of the following reasons: (1) to permit a heat engine to operate between the heat source and the heat sink at the highest possible efficiency; and (2) to improve the strength and service lifetime of the surface being cooled. A noteworthy advantage of the present invention is that it is well suited to utilizing a single phase working gas with low $T_\delta$, thereby greatly facilitating the use of high efficiency heat engines without intermediary exchangers between primary and secondary loops, especially in closed Brayton cycles.

SUMMARY OF THE INVENTION

A microtube-strip module, consisting of a plurality of parallel rows of microtubes with rectangular header tubestrips, is encapsulated in solid metal in such a way as to leave at least one major surface exposed in a manner suitable for metallurgical bonding to an objective surface requiring heat transfer. Fluid connections are provided perpendicular to the objective surface to facilitate parallel manifolding with high surface coverage.

THEORETICAL DESCRIPTION OF THE PREFERRED EMBODIMENT

Figure 1:
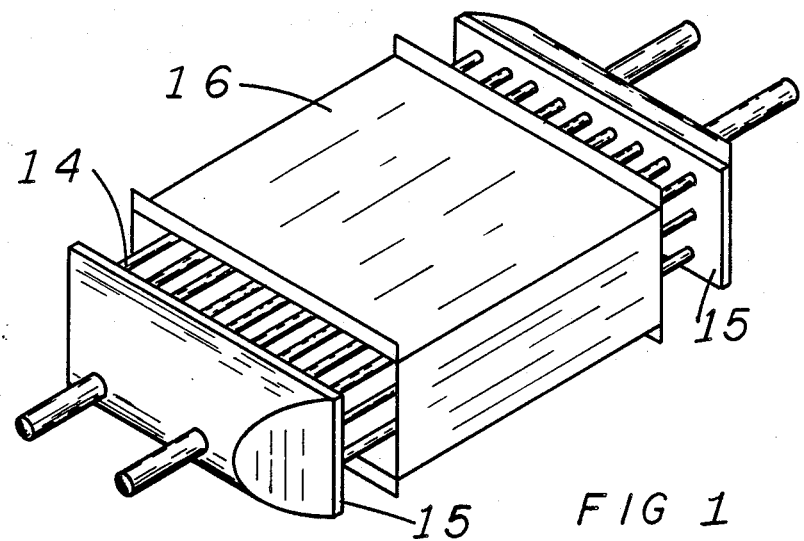
FIG. 1 illustrates an MTS module for counterflow gas-gas exchange according to the prior art.

In an earlier patent, #4,676,305, I disclose that optimum exchange between counterflowing gases is achieved by using small diameter tubes, typically 0.8 mm, in a rectangular array to simplify manifolding and press fit assembly techniques and to facilitate uniform shell side laminar flow. FIG. 1 shows a typical microtube-strip (MTS) gas-gas counterflow subassembly according to the prior art, with typically 8 rows of microtubes 14 manifolded to rectangular header tubestrips 15, and with counterflow cage 16.

Figure 2:
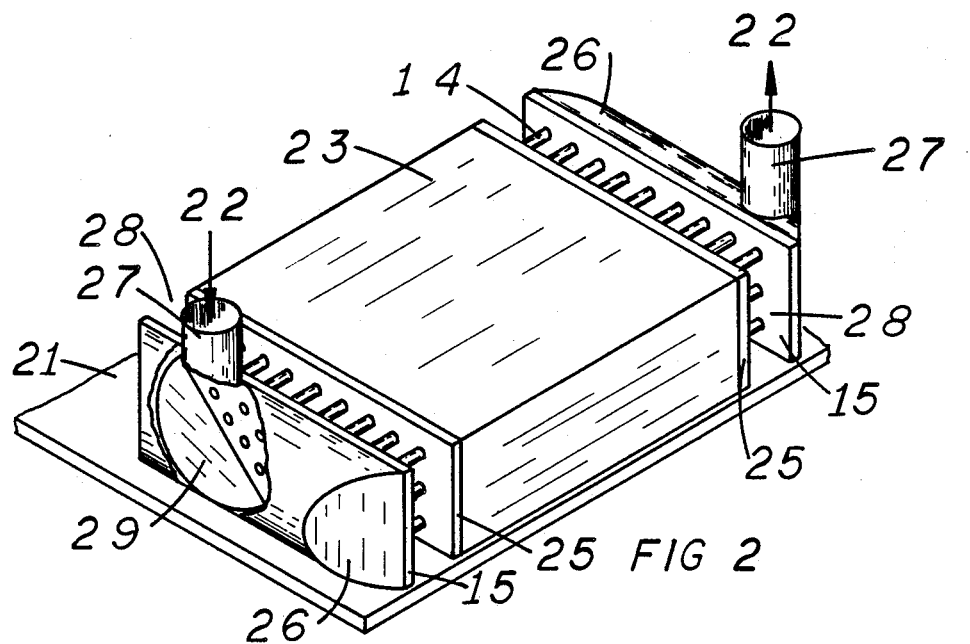
FIG. 2 is an isometric view of an MTS surface exchanger module.

FIG. 2 discloses the MTS surface exchanger. Optimal thermal transfer between an objective surface 21 and a working fluid 22 can be achieved by encasing a substantial portion of the microtube portion of the MTS subassembly in a solid metal matrix 23 so that it can be metallurgically bonded to the objective surface 21 to be cooled (or perhaps heated) by the working fluid 22.

The theory disclosed in U.S. Pat. No. 4,676,305 is somewhat relevant here, but there are several significant differences. Since surface-fluid exchangers are generally employed on substantially isothermal surfaces, it is thermodynamically impossible to utilize any counterflow principles parallel to the objective surface. Hence, the axial conduction constraint imposed by counterflow considerations is not applicable, and the perpendicular conduction requirements of the surface-fluid exchanger favor the use of high conductivity alloys—such as copper, aluminum, beryllium, lithium, magnesium, and silver—for the encasing alloy.

Assume the following conditions to permit a simplified, approximate analysis for a typical application: The surface 21 is isothermal at temperature $T_\delta$ (K) with inlet fluid 22 temperature $T_{F1}$ and outlet fluid temperature $T_{F2}$ (K).

$$P_T = G\, C_P (T_{F1} - T_{F2}), \quad (1)$$

where G is the fluid mass flow rate (kg/s), $C_P$ is the constant pressure specific heat (J/kgK), and $P_T$ is the thermal power (W). Define $T_{\delta M}$ as the mean effective perpendicular temperature drop in the encasing metal matrix 23. Then, $$P_T \approx \alpha\, A\, k_m T_{\delta M}/z, \quad (2)$$

where A is the surface area (m²) of the matrix 23 bonded to the surface 21, $k_m$ is the thermal conductivity (W/mK) of the matrix and z is the thickness (m) of the module. The above expression is an approximation because exposed surface losses are ignored (they would generally be negligible) and because $\alpha$ (a dimensionless coefficient of the order of unity) is considered to be dependent only on the microtube outside diameter, $d_2$, and the tube center-to-center spacing, $\beta d_2$. Further assume that $k_m$ is much greater than the thermal conductivity of the microtube material and that of the fluid. Then for $\beta=1.4$, $\alpha$ is approximately unity. For $n_R$ rows and $n_c$ tubes per row, in HCP pattern, with $\beta=1.4$, and substantially the entire length encased, equation (2) becomes $$P_T \approx n_c L\, k_m\, T_{\delta M}/n_R, \quad (3)$$

where L is the encased length.

Further assume laminar flow conditions. (Under high thermal flux conditions this requires the Reynolds number to be substantially less than 2000.) Then it can be shown (since the Nusselt number approaches 4) that $$P_T \approx 4\pi n L\, k_F T_{\delta F}, \quad (4)$$

where n is the total number of microtubes, $k_F$ is the thermal conductivity of the fluid, and $T_{\delta F}$ is the mean temperature difference between the fluid and the encased microtube wall. From the above definitions, $$T_{\delta F} \approx T_S - T_{\delta M} - (T_{F1} + T_{F2})/2, \quad (5)$$

where $T_S$ is the (isothermal) objective surface temperature.

The above equations can be solved simultaneously for $T_S - T_{F1}$ as follows:

$$T_S - T_{F1} \approx P_T((4\pi n L k_F)^{-1} + (2GC_P)^{-1} + n_R/(n_C L k_m)) \quad (6)$$

For a given Reynolds number and relative tube wall thickness, G is proportional to $nd_2$. For a given $\beta$ and module size, n is proportional to $d_2^{-2}$. Thus the first term inside the major parentheses in equation 6 is proportional to $d^2$, the second term is proportional to d, and the third term is independent of d. The advantage of using multiple rows of small diameter tubes when $k_m >> k_F$ is clearly demonstrated for surface-fluid exchangers. The number of rows must be kept relatively small, or the third term becomes large compared to the first two terms, resulting in both ineffective tube utilization and greater errors in the above expressions. Thus, except perhaps in extremely high flux situations, the following guideline is established:

$$n_R^2 < k_m/(4\pi k_F) \qquad (7)$$

Clearly, more than two rows would be of little advantage when liquid metals are used for the working fluid, but as many as twelve rows could often be recommended when helium is used. Finally, it should be pointed out that for a given gas velocity, the contribution from the second term in equation (6) is reduced by increasing the working gas pressure.

DETAILED DESCRIPTION OF THE PREFERRED EMBODIMENT

Implementation of the above novel theory of multilayer microtubes requires a novel modular design. MTS subassemblies as shown in FIG. 2, with typically four to eight rows of microtubes 14 (but as few as two rows or as many as twenty rows under certain conditions) are assembled according to the prior art by a press fit technique into the header tubestrip 15 by diffusion welding of the microtubes to the tubestrips. Typical microtube outside diameter (O.D.) is about 0.8 mm, but tubing as large as 3 mm may be used in certain low flux applications or when liquids or phase changes are employed in the heat transfer. Smaller tubing, typically 0.3 mm to 0.6 mm O.D., would be required for highest thermal fluxes with gases. An HCP hole pattern, with center-to-center spacing about 1.3 to 1.8 times the microtube O.D. is generally optimum, but much larger tube spacings would be appropriate for very low flux applications. Each row of microtubes would typically have 40 to 100 tubes, but as few as 6 tubes per row could be appropriate for applications with curved objective surfaces, and as many as 400 tubes per row could be appropriate at very high gas pressures with very small tubes. Typical microtube length is about 200 times the O.D., but ratios as small as 40 and as large as 1000 could be appropriate under certain conditions.

A header cap 26 is welded over the header tubestrips to facilitate manifolding. A preferred orientation of the manifold fluid connections 27 is shown that permits mounting the modules in a pattern that allows high surface coverage. A substantial portion of the microtubes have been encased in a solid metal matrix 23 to allow thermal contact to be established between the working fluid 22 and the objective surface 21. Lowest thermal resistance is achieved only if metallurgical contact is established between the microtubes 14 and the matrix 23. Such may be established with either molten metal or powder metal techniques, providing the melting point of the matrix is less than that of the microtubes and appropriate surface and environmental conditions are maintained.

When operating temperature ranges in excess of about 200° C. are anticipated, it will generally be necessary to select metals for the microtubes and matrix that have a coefficient of thermal expansion that is not too different from that of the objective surface 21 to minimize thermal stress. Thus, for example, a low expansion matrix, such as beryllium, along with low expansion microtubes, such as a nickel-chrome-tungsten alloy, might be required for high temperature superalloy surface cooling applications, while an aluminum matrix would be required for many aluminum alloy surface cooling applications. Such aluminum cooling applications could utilize nickel-chrome stainless steels for the microtubes, despite the difference in thermal expansion, due to the strength, fabrication, and corrosion advantages of the stainless steels, where temperature excursions would not be extreme. Many applications would select copper as the matrix and a 300-series nickel-chrome stainless steel for the microtubes, since their thermal expansions match well over a moderately large temperature range. Satisfactory thermal cycle fatigue life generally requires the thermally induced stresses to be small compared to the elastic stress limits of the materials.

In cases involving very high thermal flux with gases 22, where $T_{\delta M}$ is a significant fraction of $T_S$, it becomes advantageous to use tubing 14 with smaller inside diameters in rows farther from the objective surface 21 than in rows close to the objective surface so that the effects of equation (1) are more nearly equalized, since the gas viscosity increases and density decreases with rising temperature.

Techniques may also be employed to improve uniformity of flow in the lateral direction—i.e, from tube to tube within a given row. A deflector plate 29 may be added at about 45 degrees with respect to the fluid inlet or outlet port for this purpose.

In cases where significant differential expansion exists it is advantageous to leave an air space 28 between the ends of the matrix 23 and the header tubestrip 15 to reduce transverse thermal stresses in the tubestrip. To facilitate the matrix fabrication in such cases, it is desirable to incorporate a spacer tubestrip 25 near each header tubestrip 15 as shown in FIG. 2.

Figure 3:
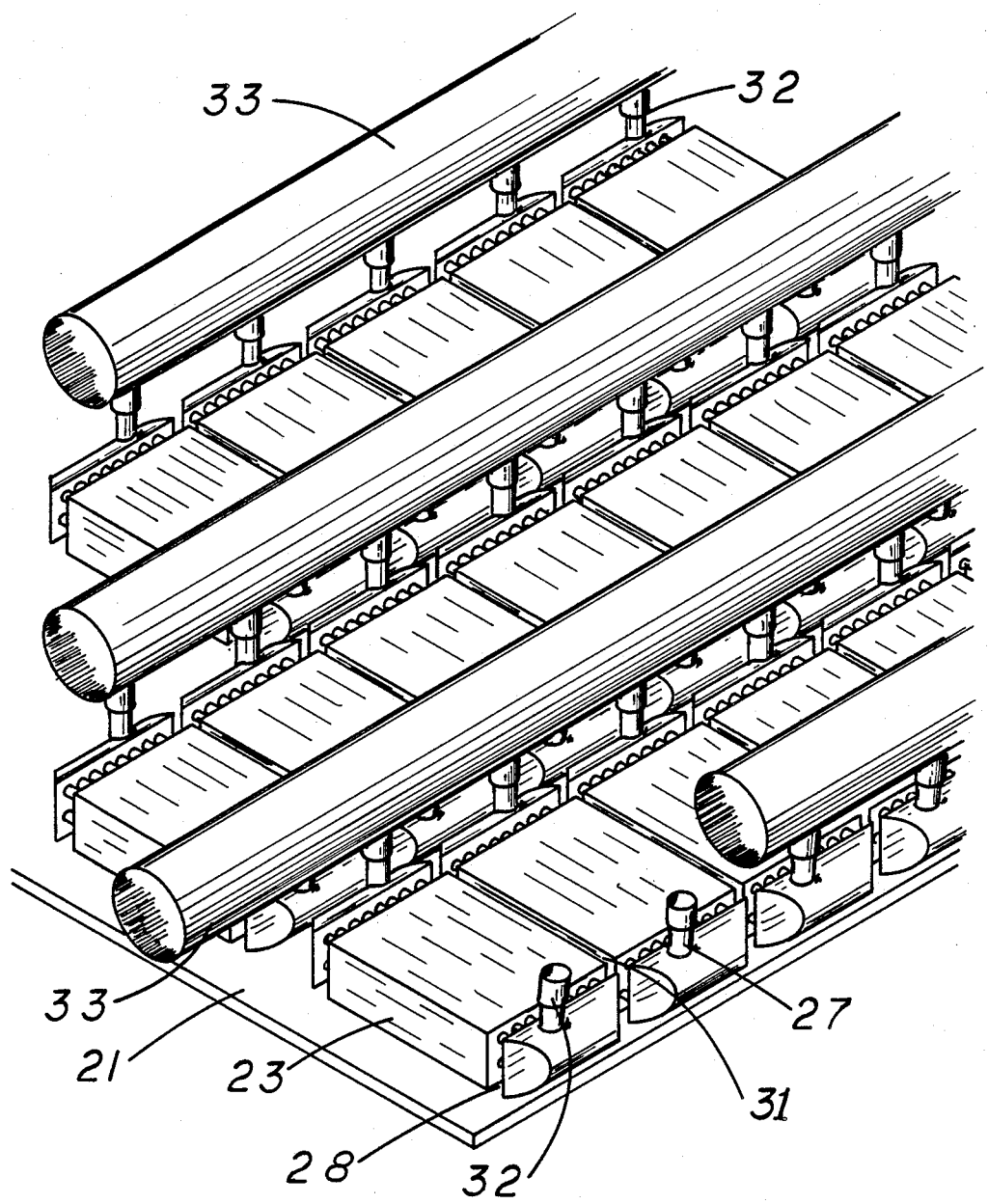
FIG. 3 shows a method of arranging and manifolding a large number of MTS surface exchangers for high surface coverage.

FIG. 3 illustrates a parallel manifolding technique suitable for high surface coverage patterns. A small air space 31 is required between the modules to accommodate manufacturing tolerances in the matrix 23, fluid connections 27 and 32, and manifolds 33. Bringing the fluid connections 27 out perpendicular to the objective surface allows the manifolds to be mounted above the modules without restricting surface packing density of the modules. A flexible link or coupling may be required, especially with an irregular objective surface 21. Improved heat transfer from a curved objective surface can be obtained by modifying the curved surface so that it is approximated by a series of flat surfaces. Alternatively, additional metal may be added to the flat transfer surface of the module matrix to allow it to be contoured to match a curved objective surface.

Although this invention has been described herein with reference to specific embodiments, it will be recognized that changes and modifications may be made without departing from the spirit of the present invention. All such modifications and changes are intended to be included within the scope of the following claims.

We claim:

1. An exchanger for the transfer of heat between an objective surface and a working fluid, comprising:
    a plurality of parallel disposed planar rows of metallic tubes, said tubes having outside diameter of less than 3 millimeters, and a length between 40 and 1000 times said outside diameter;
    a first header tubestrip joined to one end of each of said tubes;

a second header tubestrip joined to the other end of each of said tubes;

first manifold means connected to said first tubestrip for defining a fluid inlet flow path into one end of each of said tubes;

second manifold means connected to said second tubestrip for defining a fluid inlet flow path from said other end of each of said tubes; and a solid metal matrix in thermal contact with the surfaces of said tubes, said matrix occupying a major fraction of the rectangular prismatic space between and defined by said first and second tubestrips, said matrix having at least one external transfer surface suitable to be in thermal contact with said objective surface, and said matrix having a melting point below that of said tubes.

2. An exchanger according to claim 1 wherein the metallurgical joining of said tubes to tubestrips is effected by means of a press fit followed by diffusion welding.

3. An exchanger according to claim 1 wherein said tubes have center-to-center lateral spacing within said rows that is 1.3 to 1.8 times said outside diameter.

4. An exchanger according to claim 1 wherein third and fourth rectangular tubestrips, positioned between said first and second tubestrips and spaced apart from same, are used to define respective regions near said ends of said tubes that are devoid of said matrix.

5. An exchanger according to claim 1 wherein at least one of said manifold means includes a fluid connection port with axis substantially perpendicular to and opposite of one of said transfer surfaces in such a manner as to permit parallel manifolding of a plurality of such exchangers mounted on said objective surface substantially covering said objective surface.

6. An exchanger according to claim 1 wherein said metallic tubes in the planar row closest to said external transfer surface suitable for metallurgical bonding have inside diameter larger than that of those in the planar row furthest from said transfer surface.

7. An exchanger according to claim 1 wherein said manifold means includes within it a deflector plate at about 45 degrees with respect to a manifold fluid port.

8. An exchanger according to claim 1 wherein said metal matrix is metallurgically bonded to the surfaces of said tubes.

* * * * *

UNITED STATES PATENT AND TRADEMARK OFFICE
CERTIFICATE OF CORRECTION

PATENT NO. : 4,928,755

DATED : May 29, 1990

INVENTOR(S) : Doty et al.

It is certified that error appears in the above-identified patent and that said Letters Patent is hereby corrected as shown below:

On the title page at References Cited, insert the following patents

```
--4,712,609  12/1987  Iversen ....................... 165/80.4

4,703,620  11/1987  Niino et al. .................... 60/260
  4,676,305   6/1987  Doty..........................165/158
  4,703,597  11/1987  Eggemar ........................ 52/220

4,671,064   6/1987  White et al. .................... 60/517

4,583,583   4/1986  Wittel ......................... 165/46

4,550,774  11/1985  Andres et al. .............. 165/104.21

4,489,570  12/1984  Little ......................... 62/514R 4,478,277  10/1984  Friedman et al. ............... 165/135

4,397,303   8/1983  Stultz ........................ 126/442

4,394,344   7/1983  Werner et al. ................. 376/146

4,392,362   7/1983  Little ......................... 62/514R 4,386,505   6/1983  Little ......................... 62/514R 4,335,870   6/1982  Diener et al. ................. 266/193

4,294,199  10/1981  Darling et al. ................ 122/276

4,266,603   5/1981  Germann ....................... 165/171

4,256,919   3/1981  Berg ........................... 13/23
```

UNITED STATES PATENT AND TRADEMARK OFFICE
CERTIFICATE OF CORRECTION

PATENT NO. : 4,928,755
DATED : May 29, 1990
INVENTOR(S) : Doty et al.

It is certified that error appears in the above-identified patent and that said Letters Patent is hereby corrected as shown below:

```
4,186,795   2/1980   Platell  ....................... 165/53

4,161,980   7/1979   Ruger    ....................... 165/168

4,161,213   7/1979   Heide et al. ................... 165/168

4,150,657   4/1979   Bowen    ....................... 126/447

4,003,687   1/1977   Hedin    ....................... 425/406

3,554,276   1/1971   Stallkamp ...................... 165/168

1,928,443   9/1933   Archer et al. .................. 165/168--;
```

Col. 2, line 36, "=1" should read --50--; and

Col. 4, line 15, "$T_\delta(K)$" should read --$T_s(K)$--.

Signed and Sealed this

Seventeenth Day of December, 1991

Attest:

HARRY F. MANBECK, JR.

*Attesting Officer*   *Commissioner of Patents and Trademarks*